United States Patent [19]

Fodor

[11] 4,020,054

[45] Apr. 26, 1977

[54] IMPACT RESISTANT HIGH VINYL POLYDIENE THERMOSETTING COMPOSITIONS CONTAINING FIBROUS SULFUR-CONTAINING ORGANIC POLYMER

[75] Inventor: Lawrence M. Fodor, Bartlesville, Okla.

[73] Assignee: Phillips Petroleum Company, Bartlesville, Okla.

[22] Filed: July 3, 1975

[21] Appl. No.: 592,836

[52] U.S. Cl. .................. 260/23.7 M; 260/28.5 B; 260/32.6 A; 260/42.15; 260/42.32; 260/42.37; 260/887
[51] Int. Cl.[2] .......................................... C08K 3/34
[58] Field of Search ............... 260/23.7 M, 28.5 B, 260/32.6 A, 42.32, 42.37, 887

[56] References Cited

UNITED STATES PATENTS

| 3,354,129 | 11/1967 | Edmonds | 260/79 |
| 3,645,963 | 2/1972 | Kopecki et al. | 260/887 |
| 3,839,503 | 10/1974 | Kahle et al. | 260/887 |

Primary Examiner—James H. Derrington

[57] ABSTRACT

A thermosetting composition is provided comprising a high vinyl polymer of a conjugated diene, a silane coupling agent, a viscosity reducing agent, an organic peroxide curing agent, and a filler comprising inorganic, particulate metal silicate or metal oxide and sulfur-containing organic polymer fiber. In a preferred embodiment of this invention the sulfur-containing polymer is poly(phenylene sulfide) and the conjugated diene polymer has at least about 50 percent unsaturation in the form of pendant groups containing olefinic unsaturation.

8 Claims, No Drawings

IMPACT RESISTANT HIGH VINYL POLYDIENE THERMOSETTING COMPOSITIONS CONTAINING FIBROUS SULFUR-CONTAINING ORGANIC POLYMER

BACKGROUND OF THE INVENTION

This invention relates to thermosetting compositions. In one of its aspects this invention relates to thermosetting compositions prepared from mixtures of high vinyl polymer of a conjugated diene. In another of its aspects this invention relates to fillers for thermosetting compositions. In yet another of its aspects this invention relates to mixed inorganic particulate metal compounds and fibrous organic polymer as fillers for thermosetting compositions. In a preferred aspect of this invention it relates to the use of poly(phenylene sulfide) fibers as fillers for thermosetting compositions.

Thermosetting compositions having a good balance of physical and electrical properties are in demand for uses as components for automobile engines and other automobile accessories. For such uses a thermosetting composition should have excellent impact resistance as well as excellent electrical, mechanical and thermal properties.

Mineral-filled, peroxide-cured, high vinyl polydiene polymers possess the characteristics stated above that make them desirable as thermosetting compositions. I have discovered that the electrical and thermal properties of these compositions can be maintained with an improvement of the mechanical property of impact resistance in thermosetting compositions previously known in the art by the inclusion of certain fibrous fillers.

It is therefore an object of this invention to provide a thermosetting composition having excellent impact resistance. It is another object of this invention to provide easily processed thermosetting compositions having excellent physical and electrical properties.

Other objects, aspects and advantages of this invention will become apparent from a reading of the specification and the appended claims.

STATEMENT OF THE INVENTION

Therefore in accordance with this invention there is provided a thermosetting composition comprising (1) high vinyl polymer of a conjugated diene, (2) silane coupling agent, (3) processing aid, (4) organic peroxide curing agent and (5) filler comprising (a) inorganic, particulate metal silicate or metal oxide and (b) sulfur-containing organic polymer fiber.

In a preferred embodiment of this invention the filler comprises a combination of the inorganic, particulate metal compound and fibrous poly(phenylene sulfide).

The conjugated diene polymers which are suitable for use include the polymers of at least one conjugated diene having from 4 to 10 carbon atoms per molecule, the polymer having at least about 50%, and preferably from about 65 to about 90%, of the unsaturation in the form of pendant groups containing olefinic unsaturation. The polymer can have a linear or radial configuration and can be either predominantly crystalline or predominantly amorphous in nature. The polymer will generally have a molecular weight ranging from about 1,000 to about 1,000,000 as determined by gel permeation chromatography, with a more preferred range of about 5,000 to about 300,000. In terms of inherent viscosity, the polymer has a viscosity range of about 0.25 to about 3, more preferably of about 0.3 to about 2, as such ranges are particularly useful for most molding operations with the compositions of this invention.

Suitable conjugated dienes include butadiene-1,3; alkyl- and aryl-substituted-1,3-butadienes; pentadiene-1,3; alkyl-substituted-1,3-pentadienes and admixtures thereof. Exemplary polymers include polybutadiene poly(phenylbutadienes), poly(3,5-dimethyl-1,3-hexadiene), poly(2-methyl-1,3-pentadiene), polyisoprene, polypentadiene, a copolymer of butadiene-1,3 and 1-phenylbutadiene-1,3, a copolymer of butadiene-1,3 and isoprene, and the like and blends thereof. A presently preferred polymer is high vinyl polybutadiene.

A silane coupling agent is used to promote adhesion of the polymer to the filler mixture to enhance the physical properties of a subsequently molded article. Suitable silanes which can be employed are selected from the group consisting of tris(2-methoxyethoxy)vinyl silane vinyltriethoxysilane, beta(3,4-epoxycyclohexyl)ethyltrimethoxysilane, gamma-glycidoxypropyltrimethoxysilane, gamma-aminopropyltriethoxysilane, gamma-mercaptopropyltrimethoxysilane, vinyltriacetoxysilane, N-beta-(aminoethyl)-gamma-aminopropyltrimethoxysilane, gamma-methacryloxypropyltrimethoxysilane, and the like and mixtures thereof. A presently preferred silane is gamma-methacryloxypropyltrimethoxysilane.

A processing aid can be included in the thermosetting compositions to reduce their apparent viscosity thus improving processability of the compositions during compounding and molding. A processing aid for the purpose of this invention is a compound compatible with the other components of the composition that will reduce the apparent viscosity of the composition. Exemplary processing aids include metal carboxylates such as calcium stearate and zinc stearate and the like, naturally occurring and synthetic waxes such as beeswax, microcrystalline wax, Fischer Tropsch wax, polyethylene and polyproylene waxes, ceresin, amides such as erucamide, oleamide, stearamide, ethylene bis(stearamide) and the like and admixtures thereof.

The organic peroxide curing agent employed in the compositions include the dihydrocarbyl peroxides, the peroxy esters, and the peroxy ketals, preferably containing up to about 30 carbon atoms per molecule, Exemplary compounds include t-butyl peroxybenzoate, di-t-butyl peroxide, dicumyl peroxide, t-butylperoxy isopropyl carbonate, n-butyl-4,4-bis(t-butyl-peroxy) valerate, alpha, alpha'-bis(t-butylperoxy)diisopropyl benzene, 2,5-dimethyl-2,5-bis(t-butylperoxy)hexane, 2,5-dimethyl-2,5-bis(t-butylperoxy)-3-hexyne, 2,5-dimethyl-2,5-dihydroperoxyhexane, and mixtures thereof. A presently preferred organic peroxide is 2,5-dimethyl-2,5-bis(t-butylperoxy)-3-hexyne.

The filler combination of this invention consists of inorganic, particulate metal silicates or metal oxides which are substantially water insoluble and a fibrous component which is formed from a sulfur-containing organic polymer. Suitable metal silicates are derived from the group of metals consisting of aluminum, copper, silver, magnesium, calcium, cadmium, lead, manganese and nickel, with calcium silicate presently preferred. Metal oxides are selected from the metals: aluminum, iron, magnesium, silicon, titanium, zinc and zirconium. Oxides presently preferred are alumina and silica. The metal silicates or oxides can be of natural or synthetic origin. The fiber portion of the filler system is produced from poly(phenylene sulfide) (PPS) polymers such as those described in U.S. Pat. No. 3,354,129. The polymers made according to this patent may require a heat treatment step to increase the molecular weight of the polymer so that fibers can be more readily prepared from them.

The ratio of the various components used in the composition of this invention can vary over a wide range depending upon the materials employed and of the characteristics desired in the molded product. Generally, the total filler content will range from about 40 to about 500 parts by weight, preferably about 100 to about 400 parts by weight, per 100 parts by weight polymer (php). The weight ratio of PPS fiber to metal silicate or metal oxide will generally range from about 0.1:1 to about 1:1. The volume ratio of PPS fiber to metal silicate or metal oxide will generally range from about 0.4:1 to about 2:1. The amount of organic silane will vary depending upon quantity of filler used, but in general, the silane will be present in an amount ranging from about 0.1 to about 10 php, more preferably about 0.5 to about 5 php. The organic peroxide curing agent will generally be used in an amount ranging from about 1 to about 12 php, more preferably from about 2 to about 8 php. The processing aid will be generally used in an amount ranging from about 0.5 to about 8 php, more preferably from about 1 to about 4 php. Other additives such as stabilizers, antistatic agents, pigments, colorants, and the like can also be employed in the compositions providing they do not have an adverse affect on the properties of the molded articles.

All the components of the compositions are uniformly mixed prior to molding to achieve the best results. Mixing devices such as Banbury mixers, Brabender Plastographs (a mixing device manufactured by the G. W. Brabender Company), roll mills, compounding extruders can be employed. An elevated temperature is preferred but the temperature employed should be below the activation temperature of the particular peroxide curing agent used to prevent premature curing of the composition.

The thermosetting compositions of this invention can be compression molded and cured at elevated temperatures in the range of about 150° to about 250° C in a time period ranging from about 5 minutes to about 1 hour.

EXAMPLE I

In each of the following runs the thermosetting composition was prepared by mixing 100 parts by weight of a silicon tetrachloride-coupled polybutadiene radial polymer having a Mooney viscosity, ML-4 at 212° F (100° C) of 7, an inherent viscosity of 0.89 and 68.7% of the unsaturation being in the form of pendant vinyl groups with the following components, when used, each expressed in parts by weight per 100 parts by weight polymer (php): zinc stearate, 2 php; gamma-methacryloxypropyltrimethoxysilane, 2 php; and 4 php of 2,5-dimethyl-2,5-bis(t-butylperoxy)-3-hexyne. The amounts of particulate filler, Wollastonite, a naturally occuring acicular calcium metasilicate having a particle size expressed at 50% median size of 5.5 microns (5.5 × 10$^{-4}$ cm) and the fibrous filler incorporated in the compositions are shown in the following Tables. The fibrous component was used in the form of about ¼–½ inch (0.6–1.25 cm) lengths.

Each composition was generally compounded by mixing all the components in a Brabender Plastograph for 5 minutes in an air atmosphere at a temperature in the range of 115° ± 15° C followed by sheeting off the composition on a 2-roll mill maintained at about 20° C by cooling water. The glass fiber compositions, however, were prepared by mixing the components in the absence of the glass to avoid fracturing it in the Brabender Plastograph and sheeting off the mixtures as before. The glass fiber was sprinkled onto each of the sheets (sheeted off as thin as possible) as required, the sheet was rolled up and it was milled without banding on the cool mill until a uniform appearing composition was obtained, i.e., passed through the rolls ten times. Each completed formulation, unless otherwise indicated, was compression molded for 5 minutes at a temperature of 400° F (204° C) at a pressure of 20,000 to 30,000 psig (1406 to 2106 kg/cm$^2$) to form bars ⅛ × ½ × 5 inches (0.31 × 1.27 × 12.7 cm) from which the Izod impact values were determined and 1/16 × ½ × 5 inches (0.16 × 1.27 × 12.7 cm) from which the flexural modulus values were determined. Some of the modulus bars were cut into the proper dumbbell shape for a determination of the tensile and elongation values. The values were determined in accordance with the following ASTM tests:

| | |
|---|---|
| Hardness, Shore D | D 2240–68 |
| Flexural Modulus, psi | D 790–66 |
| Izod Impact, ft. lbs/inch notch | D 256–66 |
| Tensile Strength, psi, 2"/minute | D 638–68 |
| Elongation, %, 2"/minute | D 638–68 |

The fibrous components were characterized as follows:

Poly(phenylene sulfide): 70 denier, six-strand multifilament with a tenacity of 2.1g/denier melt spun from 492 melt flow polymer chopped into ½ inch (1.25 cm) lengths. The polymer was prepared according to U.S. Pat. No. 3,354,129 by reaction of dichlorobenzene and sodium sulfide in an N-methyl-pyrrolidone solvent, recovering the product and heat treating it in a air oven at about 500° F (260° C) to reduce the melt flow to 492. The melt flow is determined in accordance with ASTM D 1238-70 at a temperature of 600° F (316° C) using a 5 kg weight and is reported as grams per 10 minutes.

Glass fiber: Grade CS-308 obtained from Johns-Manville, Denver, Colorado, chopped into ¼ inch (0.6 cm) lengths.

Polyacrylonitrile (orlon): Type 75, obtained from Testfabrics, Inc., New York, N.Y., chopped into ½ inch lengths.

Polyamide (nylon): No. 927W flock obtained from Claremont Chemical Co., Claremont, N.H.

Polyester (polyethylene terephthalate): No. 3 dacron, 3 denier/filament, obtained from Microfiber, Inc., Pawtucket, R.I., chopped into ½ inch lengths. The results are presented in the following Tables.

TABLE I-A

Compositions Containing Fibrous Poly(phenylene) Sulfide (PPS)

| | Fillers | | | | | | Physical Properties | | | | |
|---|---|---|---|---|---|---|---|---|---|---|---|
| | Wollastonite | | PPS | | Hardness | Notched Izod Impact | | Flexural Modulus | | Tensile Strength | | Elonga- |
| Run | php | vol. % | php | vol. % | Shore D | ft. lbs. | joules/meter | psi ×10⁻³ | megapascals | psi | megapascals | tion % |
| 1 | 300 | 48 | 0 | 0 | 93 | 0.24 | 12.8 | 1691 | 11,660 | 8450 | 58.26 | 3 |
| 2 | 275 | 44 | 12 | 4 | 93 | 0.32 | 17.1 | 1476 | 10,180 | 6150 | 42.40 | 1 |
| 3 | 250 | 40 | 23 | 8 | 92 | 0.71 | 37.9 | 1271 | 8,763 | 5070 | 34.96 | 1 |
| 4 | 225 | 36 | 35 | 12 | 92 | 0.88 | 47.0 | 1135 | 7,830 | 4910 | 33.89 | 2 |
| 5 | 200 | 32 | 46 | 16 | 91 | 1.03 | 55.0 | 1019 | 7,026 | 5530 | 38.13 | 2 |
| 6 | 175 | 28 | 58 | 20 | 90 | 1.12 | 59.8 | 874 | 6,026 | 5290 | 36.47 | 2 |

TABLE I-B

Compositions Containing Glass Fibers

| | Wollastonite | | Glass | | Notched Izod Impact | |
|---|---|---|---|---|---|---|
| Run | php | vol. % | php | vol. % | ft. lbs. | joules/meter |
| 7 | 300 | 48 | 0 | 0 | 0.32 | 17.1 |
| 8 | 250 | 40 | 45 | 8 | 0.81 | 43.2 |
| 9 | 200 | 32 | 90 | 16 | 1.22 | 65.1 |
| 10 | 150 | 24 | 135 | 24 | 1.46 | 77.9 |
| 11 | 100 | 16 | 180 | 32 | 1.90 | 101 |

Note:
No other physical properties were determined for these compositions.

glass fibers since the PPS weight was about one-half that of the weight of the glass.

Reasonable variation and modification are possible within the scope of the foregoing disclosure and the appended claims of the invention, the essence of which is that the combination of inorganic, particulate metal compounds and sulfur-containing organic polymer fiber used as a filler in a thermosetting composition comprising high vinyl polymer of a conjugated diene provides excellent impact resistance to the thermosetting composition which is superior to a thermosetting composition having the same components with the

TABLE I-C

Compositions Containing Fibrous Polyacrylonitrile (PAN)

| | Fillers | | | | | | | Physical Properties | | | | |
|---|---|---|---|---|---|---|---|---|---|---|---|---|
| | Wollastonite | | PAN | | Hardness | Notched Izod Impact | | Flexural Modulus | | Tensile Strength | | Elonga- |
| Run | php | vol. % | php | vol. % | Shore D | ft. lbs. | joules/meter | psi ×10⁻³ | megapascals | psi | megapascals | tion % |
| 12 | 300 | 48 | 0 | 0 | 93 | 0.33 | 17.6 | 1778 | 12,300 | 8260 | 56.95 | 2 |
| 13 | 275 | 44 | 10 | 4 | 93 | 0.33 | 17.6 | 1510 | 10,410 | 6770 | 46.88 | 2 |
| 14 | 250 | 40 | 20 | 8 | 93 | 0.32 | 17.1 | 1404 | 9,681 | 6840 | 47.16 | 2 |
| 15 | 225 | 36 | 30 | 12 | 93 | 0.32 | 17.1 | 1208 | 8,329 | 6000 | 41.37 | 2 |
| 16 | 200 | 32 | 40 | 16 | 93 | 0.31 | 16.5 | 1092 | 7,529 | 6100 | 42.06 | 2 |
| 17 | 175 | 28 | 50 | 20 | 93 | 0.39 | 20.8 | 968 | 6,674 | 5270 | 36.34 | 2 |
| 18 | 150 | 24 | 60 | 24 | 92 | 0.39 | 20.8 | 853 | 5,881 | 5070 | 34.96 | 2 |

TABLE I-D

Compositions Containing Fibrous Polyamide (PA) or Fibrous Polyethylene Terephthalate (PET)

| | Wollastonite | | PA | | PET | | Hardness | Notched Izod Impact | | Flexural Modulus | | Tensile Strength | | Elonga- |
|---|---|---|---|---|---|---|---|---|---|---|---|---|---|---|
| Run | php | vol. % | php | vol. % | php | vol. % | Shore D | ft.lbs. | joules/meter | psi ×10⁻³ | megapascals | psi | megapascals | tion % |
| 19 | 250 | 40 | 19.4 | 8 | — | — | 90 | 0.32 | 17.1 | 1163 | 8,019 | 5240 | 36.13 | 3 |
| 20 | 225 | 36 | 29.2 | 12 | — | — | 92 | 0.33 | 17.6 | 996 | 6,867 | 5700 | 39.30 | 2 |
| 21 | 200 | 32 | 38.9 | 16 | — | — | 90 | 0.41 | 21.9 | 881 | 6,074 | 5170 | 35.65 | 2 |
| 22 | 175 | 28 | 48.6 | 20 | — | — | 89 | 0.50 | 26.7 | 727 | 5,013 | 5260 | 36.27 | 2 |
| 23 | 250 | 40 | — | — | 23.7 | 8 | 92 | 0.33 | 17.6 | 1051 | 7,247 | 4760 | 32.82 | 2 |
| 24 | 225 | 36 | — | — | 35.6 | 12 | 90 | 0.92 | 49.1 | 1231 | 8,488 | 7130 | 49.16 | 2 |
| 25 | 200 | 32 | — | — | 47.5 | 16 | 89 | 0.50 | 26.7 | 932 | 6,426 | 5060 | 34.89 | 3 |
| 26 | 175 | 28 | — | — | 59.3 | 20 | 90 | 0.59 | 31.5 | 737 | 5,082 | 4830 | 33.30 | 2 |

Note:
Compositions molded at 375° F (190.5° C) for 5 minutes using previously mentioned pressure.

Inspection of the results shows that only PPS fibers and glass fibers contribute significantly to the reinforcement of the various thermosetting compositions based on the improvement in impact resistance obtained as the fiber content increased. The textile fibers, i.e., PET, PA and PAN, on the other hand contributed little to improving impact resistance of the compositions containing them. A comparison of the glass fiber and PPS fiber results at similar volume percent loadings shows that fibers of PPS are almost equivalent to fibers to glass in performance. The similarity is even closer if allowance is made for the lower impact resistance shown in run 1 for the PPS series compared to run 7 of the glass series. At equivalent volume percent loadings an appreciable advantage in decreased weight for the compositions is obtained by using PPS fibers in place of exception of the sulfur-containing organic polymer fiber.

I claim:
1. A thermosetting composition comprising:
   1. high vinyl polymer of conjugated diene, said diene having 4–10 carbon atoms per molecule with the polymer having at least 50 percent unsaturation in the form of pendant groups having olefinic unsaturation,
   2. silane coupling agent,
   3. process aid,
   4. organic peroxide curing agent, and
   5. filler comprising:
      a. inorganic, particulate metal silicate or metal oxide and
      b. phenylene sulfide polymer fiber.

2. A thermosetting composition of claim 1 wherein the total filler contained ranges from about 40 to about 500 parts by weight per 100 parts by weight polymer, the weight ratio of poly(phenylene sulfide) fiber to metal silicate or metal oxide is in the range from about 0.1:1 to about 1:1, the organic silane is present in the range of from about 0.1 to about 10 parts per hundred parts by weight of polymer, the organic peroxide curing agent is present in the range of about 1 to about 12 parts per hundred parts by weight of polymer, and the processing aid is present in the range of about 0.5 to about 8 parts per hundred parts by weight of polymer.

3. A composition of claim 2 wherein said metal silicate is chosen from among silicates of aluminum, copper, silver, magnesium, calcium, cadmium, lead, manganese and nickel.

4. A thermosetting composition of claim 1 wherein the said metal oxide is chosen from among oxides of aluminum, iron, magnesium, silicon, titanium, zinc and zirconium.

5. A thermosetting composition of claim 3 wherein said polymer of a conjugated diene is a silicon tetrachloride-coupled polybutadiene radial polymer, said silane coupling agent is gamma-methacryloxypropyltrimethoxysilane, said processing aid is zinc stearate, said organic peroxide is 2,5-dimethyl-2,5-bis(t-butylperoxy)-3-hexyne, and said silicate is acicular calcium metasilicate.

6. A molded and cured composition of claim 1.
7. A molded and cured composition of claim 2.
8. A molded and cured composition of claim 5.

* * * * *

UNITED STATES PATENT AND TRADEMARK OFFICE
CERTIFICATE OF CORRECTION

PATENT NO. : 4,020,054
DATED : April 26, 1977
INVENTOR(S) : Lawrence M. Fodor

It is certified that error appears in the above—identified patent and that said Letters Patent are hereby corrected as shown below:

Column 8, line 1, "1" should be --- 2 --- and line 11, after "said" insert --- metal ---.

Signed and Sealed this second Day of August 1977

[SEAL]

Attest:

RUTH C. MASON
Attesting Officer

C. MARSHALL DANN
Commissioner of Patents and Trademarks